United States Patent
Burdis et al.

(10) Patent No.: US 6,601,541 B2
(45) Date of Patent: Aug. 5, 2003

(54) METHOD OF PRODUCING STEAM AND CALCINED RAW MEAL

(75) Inventors: Vassilios Burdis, Butzbach (DE); Krzysztof Kietlinski, Elbag (PL); Enrico Malfa, Zanica (IT); Reinhard Schurian, Lengnau (CH); Srivats Srinivasachar, Sturbridge, MA (US); Frank Steege, Nurnbeerg (DE); Majed Toqan, La Celle St. Cloud (FR)

(73) Assignee: Alstom Ltd, Baden (CH)

( * ) Notice: Subject to any disclaimer, the term of this patent is extended or adjusted under 35 U.S.C. 154(b) by 0 days.

(21) Appl. No.: 10/220,980
(22) PCT Filed: Mar. 9, 2001
(86) PCT No.: PCT/IB01/00340
§ 371 (c)(1),
(2), (4) Date: Oct. 21, 2002
(87) PCT Pub. No.: WO01/72655
PCT Pub. Date: Oct. 4, 2001

(65) Prior Publication Data
US 2003/0059735 A1 Mar. 27, 2003

(30) Foreign Application Priority Data
Mar. 27, 2000 (EP) ............................................. 00105996

(51) Int. Cl.[7] ................................................. F22B 1/00
(52) U.S. Cl. ........................ 122/4 D; 110/245; 432/14
(58) Field of Search ............................ 432/106, 14, 58; 122/4 D; 110/245

(56) References Cited

U.S. PATENT DOCUMENTS

| 4,392,353 A | * | 7/1983 | Shibuya et al. ................ 432/14 |
| 4,496,313 A | * | 1/1985 | Quittkat et al. ................ 432/14 |
| 4,541,245 A | * | 9/1985 | Becker et al. ................. 432/14 |
| 5,205,227 A | * | 4/1993 | Khinkis et al. ............... 110/345 |

FOREIGN PATENT DOCUMENTS

| DE | 290 145 A5 | * | 10/1983 |
| EP | 0059542 | * | 2/1982 |

* cited by examiner

Primary Examiner—Jiping Lu
(74) Attorney, Agent, or Firm—Russell W. Warnock

(57) ABSTRACT

A method of producing a calcined raw meal and of producing additional steam in an existing steam generator comprises the following steps: pulverized raw meal, hydrocarbon, primary air and secondary air are fed to a calciner system (60), wherein the raw meal is calcined in a temperature range between 850° C. and 950° C., the calcined raw meal is separated from the calciner flue gases at the exit of the calciner system, the calcined raw meal is directed through a cooler (70), in which it exchanges its heat with the secondary air, the calciner exhaust gases are directed in the gas path of the backpass of the steam generator (1) at an appropriate temperature window and are used for steam production. The raw meal consists mainly of limestone ($CaCO_3$) and the calcined material is mainly lime (CaO). The fuel feed (4) to the steam generator (1) is reduced during introduction of the exhaust gases into its backpass.

5 Claims, 2 Drawing Sheets

METHOD OF PRODUCING STEAM AND CALCINED RAW MEAL

FIELD OF THE INVENTION

The invention relates to a method of producing a calcined raw meal and of producing additional steam in an existing steam generator.

DISCUSSION OF BACKGROUND

In the production of Portland cement, the raw ingredients after having been preheated pass through different heating stages in the clinker making process. Thus in a rotary kiln they first pass through a calcining zone in which calcium carbonate $CaCO_3$ is thermally decomposed to lime. The calcining zone is typically at temperatures over 800° C. The development of rotary kilns for clinker production is directed to the goal of utilizing the shortest possible kiln which leads to an kiln-external precalcining of the raw mix. Or in such precalciners arranged upstream the feed end of a kiln, the concentration of alkali and sulfur compounds can lead to the formation of injurious incrustations. Under some conditions, dust and material circulations can interact when the basic flow is disrupted due to the incrustrations or lining damage. As a result, continued circulation can lead to high build-up concentration of compounds at individual locations of the calcining system even though these materials are present in only small amounts in the raw mix or in the fuel.

On the other hand, a considerable number of power plants, especially of the PC-type, have a utilization factor, which is lower than their availability. Say a power plant, which has an availability of normally 85–90%, operates only with a utilization factor of 60%. This can be the case for old plants, which have been not equipped with environmental systems and are therefore used only to provide the peak power demands, or are used as stand-by plants. Old plants are also used part time, because their efficiency is lower as compared to the newer ones.

SUMMARY OF THE INVENTION

Accordingly, the object of the invention is to provide a novel method to revamp an existing fossil power plant being equipped either by a pulverized coal fired boiler or by a circulating fluidized bed boiler, while simultaneously providing a product that might be used in the cement industry.

This is achieved, according to the invention, by following method steps:

pulverized raw meal, hydrocarbon, primary air and secondary air are fed to a calciner system, wherein the raw meal is calcined in a temperature range between 850° C. and 950° C., the calcined raw meal is separated from the calciner flue gases at the exit of the calciner system, the calcined raw meal is directed through a cooler, in which it exchanges its heat with the secondary air, the calciner exhaust gases are directed in the gas path of the backpass of the steam generator at an appropriate temperature window and are used for steam production.

The advantages of the invention are to be seen in that the waste heat from the calcining flue gases can be used for steam production by cooling the gases in the backpass of the boiler without impacting the boiler operation and design. If limestone is calcined to lime in the calciner system, the cement industry is provided with a product that enables an increase of about 100% of clinker output with an existing rotary kiln. If the steam is used for power production, other advantages are to be seen in a high level of operation fexibility of such an electricity/lime co-production system; the possibility of autonomous or highly independent control of power generation and calcination processes is given. Furthermore existing power plants which operate at low capacity factor are cost effectively upgraded to produce a second revenues stream.

During introduction of the exhaust gases into the backpass of the steam generator, the fuel feed to the steam generator may be reduced. This feature has the advantage of producing steam at lower cost.

During introduction of the calciner exhaust gases into the backpass of the steam generator, the feed of the sulfur sorbent material to the steam generator may be ceased if a circulating fluidized bed boiler is used, or the existing sulfur removal system may be put out of operation if a boiler with pulverized coal is used. This feature results in considerable savings, since the desulfurization of the boiler flue gases is now performed by the lime contained in the calciner exhaust gases. Thus specially dedicated desulfurization systems may be substituted.

BRIEF DESCRIPTION OF THE INVENTION

A more complete appreciation of the invention and many of the attendant advantages thereof will be readily obtained as the same becomes better understood by reference to the following detailed description when considered in connection with the exemplary embodiments schematically shown in the accompanying drawing.

Only the elements essential for understanding the invention are shown. Arrows illustrate the flow direction of the working media.

DESCRIPTION OF THE PREFERRED EMBODIMENT

Figure 1:
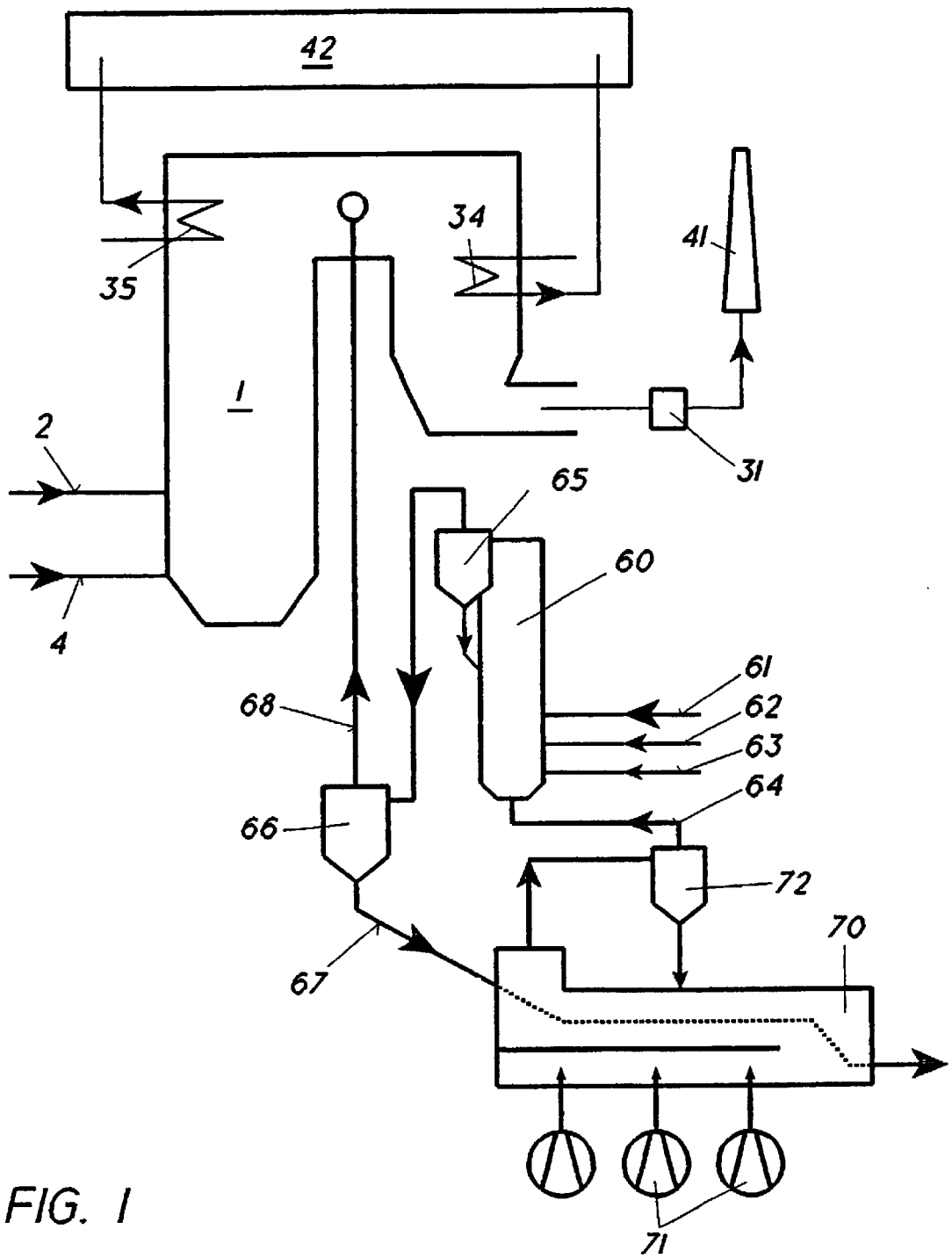
FIG. 1 illustrates an embodiment of the invention with a steam generator fired with pulverized coal.

Referring now to FIG. 1, the equipment necessary for producing steam in an existing steam generator and of producing a calcined raw meal feedstock consists mainly of a boiler 1 fired with pulverized coal and a calciner 60 followed by a solids cooler 70. The steam is used for power generation in a steam turbine island 42.

The boiler 1 is an entrained flow type apparatus and is fed via line 2 with pulverized coal and via line 4 with preheated combustion air. Part of the heat produced by coal combustion is absorbed in the walls of the combustor. In the present example the heat exchange is supposed to occur in an evaporator 35. In the boiler backpass further heat exchange apparatus 34 being connected to the water/steam cycle are arranged. The boiler flue gas is directed, after dedusting (not shown) to a limestone scrubber 31 for desulfurization. Gypsum $CaSO_4$ is formed in the limestone scrubber by combining $CaCO_3$ with $SO_2$ and oxygen. The gas exit of the scrubber is connected to stack 41.

The calciner 60 is an entrained flow type apparatus. Heat is released from the calciner fuel during the fuel retention time. This released heat is consumed by the simultaneous de-carbonation of the raw meal. In this example the raw meal is constituted mainly by limestone ($CaCO_3$), and the hydrocarbon is coal, although other liquid, gaseous or solid fuels could be used. The use of a low grade, high ash coal presents no difficulty, as the fuel ash is mixed with the raw meal in the calciner.

For producing an amount of 31 kg/sec of calcined lime, an amount of 47 kg/sec of limestone is fed into the calciner via line 61 in pulverized form. Typically 90% of the limestone particles are smaller than 90 microns, the size being appropriate for a downstream cement clinkering process.

Pulverized coal in the amount of 5 kg/sec is introduced mechanically or pneumatically to the lower portion of the calciner. If coal is introduced pneumatically via line 63, primary air via line 62 in the amount of 9.5 kg/sec is used as a transportation mean.

Secondary preheated air in the amount of 38 kg/sec enters the calciner via line 64, in this exemple through the central inlet of the calciner bottom cone.

The burners are placed to ensure a good distribution of fuel across the cross section of the calciner. It is aspired to a high burnout degree of the calciner fuel. The temperature of the gas/particle suspension is expected to about 900° C., corresponding to a calcination degree of 90–98% of the raw meal. At temperatures above about 800° C., limestone $CaCO_3$ is calcined into CaO. CaO combines with $SO_2$ released from coal combustion and oxygen to form gypsum $CaSO_4$.

At the exit of the calciner the calcined raw meal is separated from the flue gases in a at least one cyclone, preferably in series of cyclones 65, 66. Hot solids being separated in cyclone 65 are returned to the calciner. Hot solids being separated in cyclone 66 and having a temperature of about 900° C. are introduced via line 67 into the solids cooler 70.

Cooler 70 might be a bubbling bed apparatus. Ambient air in the amount of 38 kg/sec is fed by a series of fans 71 to different compartments of the cooler. By heat exchange with the hot solids it is heated up to a temperature of 650° C. The air exits the cooler into a cyclone 72, in which solids are separated and returned to the cooler. The air leaving the cyclone is used as secondary air in the calciner 60. The solids are leaving the cooler at a temperature of about 70° C.

The calciner exhaust gases from the cyclone 66 in the amount of 69 kg/sec are directed via a flue gas line 68 into the gas path of the backpass of the steam generator 1 at an appropriate temperature window. In the apparatus 34 arranged downstream the introduction they contribute to the steam production.

In order to keep the mass flow through the backpass at least approximately constant, the fuel feed and the combustion air to the steam generator is reduced in a corresponding amount during introduction of the exhaust gases into the backpass.

If the fuel for the steam generator has a high sulfur content, which releases as $SO_2$ during combustion, a sulfur sorbent is used in the downstream arranged scrubber 31 in order to remove the sulfur out of the flue gases. The cyclone 67 is designed in a way that sufficient lime escapes it. As the flue gases exiting the cyclone 67 downstream the calciner thus contain an important amount of lime, during their introduction into the boiler backpass the operation of the srubber 31 may be ceased. No additional sorbent is necessary respectively no extra desulfurization system is needed, since the injection of the lime into the backpass achieves very high sulfur removal efficiency (greater than 98%). Indeed the temperature regime has the right value for desulfurization and the lime has been produced at optimal conditions to have a high reactivity.

Figure 2:
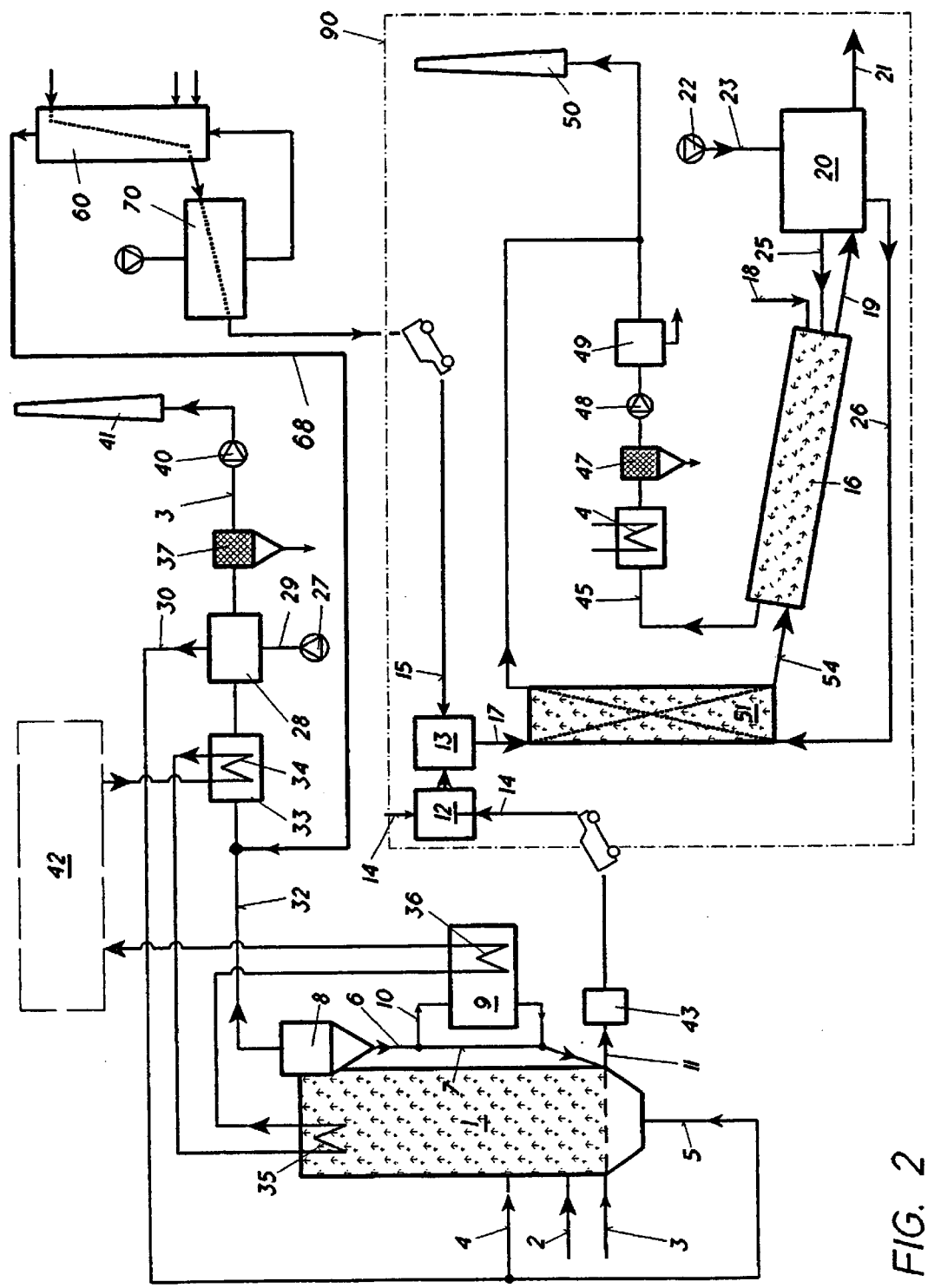
FIG. 2 illustrates the use of the invention in a cement plant with a circulating fluidized bed steam generator.

FIG. 2 shows the utilization of the raw mix calcined in calciner 60 and cooled in cooler 70 in a cement plant 90. The existing steam generator consists of a circulating fluidized bed reactor 1, called hereafter CFB. The steam is again used for power generation in a steam turbine island 42. The cement plant consists mainly of a preheater 51, a rotary kiln 16 and a clinker cooler 20.

Regarding the "Steam" Production

Via air intake line 29 ambient air is introduced in the system by a fan 27. This air is preheated in an air preheater 28 being part of the boiler backpass. Via line 30 the air is fed to the combustor 1, in which it penetrates via a fluidizing air supply 5 and a secondary or overbed air supply 4. In the example shown on FIG. 2, in which the reactor is an upright circulating fluidized-bed steam generator with a flow stream from bottom to top, the fluidizing air is introduced at the bottom through an air distributor. The secondary air is fed through one or more elevations of ports in the lower combustor.

The reactor is provided with three other inlets. One carbonaceous residue supply line 6, one inlet 2 for the coal and one inlet 3 for a sulfur sorbent.

Coal and sorbent is introduced mechanically or pneumatically to the lower portion of the reactor. This coal can be either crushed or pulverized. If the coal is in form of crushed material with a size of approximately 6-mm, it can be fed by gravity.

Combustion takes place throughout the combustor, which is filled by bed material. Flue gas and entrained solids leave the combustor and enter one or more cyclones 8, where the solids are separated.

The flue gas and the fly ash exit the gas outlet of the separation device 8 via a flue gas line 32 into the boiler backpass. These separated gases are further treated before disposal. They are first cooled down in a gas cooler 33, thereby producing steam or heating up water in an heat exchanger 34 integrated in the water/steam cycle of a steam turbine island 42. Downstream the gases are further cooled in the air preheater 28. The gas is supposed to leave this gas cooler 28 with a temperature of about 100–160° C. Downstream the gas cooler a solids filter 37 is provided in the line 38 to remove from the gas all the remaining solids. This filter 37 could be a fabric filter or an electrostatic precipitator. A fan 40 is installed in the gas line exiting the filter, preferably on the clean side of the filter 37. Its purpose is to compensate the pressure losses and to control the pressure in the system. The cleaned gas leaves the system via the stack 41.

The solids separated in the cyclone 8 are recycled to the combustor via line 6. The major portion is directly returned to the fluidizing bed via line 7. Some solid is diverted via line 10 to an external fluidized-bed heat exchanger 9 and then added to the portion in line 7. The bed temperature in the combustor 1 is essentially uniform and is maintained at an optimum level for sulfur capture and combustion efficiency by heat absorption in the walls of the combustor. In the present example the heat exchange is supposed to occur in an evaporator 35. Superheating of the steam and—for large steam turbine units with a reheat cycle—reheating is performed preferably by further heat removal from the hot solids absorption in the fluidized-bed heat exchanger 9 and/or in the gas-cooler 33. This heat exchanger 9 is containing immersed tube bundles. The flow rate of the solids through apparatus 9 via line 10 can be used to control the steam temperature. The produced superheated steam is fed to the turbine island 42 comprising at least one steam turbine driving a generator producing electrical power.

Sulfur compounds in the fuel are mainly released in the CFB reactor 1 as $SO_2$. In CFB steam production units, the amount of sulfur sorbent, i.e. limestone needs to be minimized—Ca/S molar ratio typically around 2—to minimize operating costs. Via line 3, limestone is fed into the reactor in pulverized or in crushed form. At temperatures above about 800° C., limestone $CaCO_3$ is calcined into CaO. CaO combines with $SO_2$ released from coal combustion and oxygen to form gypsum $CaSO_4$.

Draining off solids controls solids inventory in the CFB. The hot solids drained of the fluidizing bed via line 11 are cooled down through an ash cooler 43.

The calcination of the raw meal has been performed as described under FIG. 1. The calciner exhaust gases from the cyclone are directed via a flue gas line 68 into the gas path of the backpass of the steam generator 1 in an area, where the temperature is around 900° C. In the apparatus 34 arranged downstream the introduction they contribute to the steam production.

Regarding the "Cement" Production

The ashes of the power production can be used to replace part of the cement raw mix in the cement production. Indeed coal ashes are similar in composition to calcined clays. Moreover all of the coal residues are converted into cement, the sulfur is absorbed by clinker component CaO.

The drained off and cooled solids are thus transported to the cement plant 90. They are introduced in a grinder 12 in which they are ground to an extent that 90% are below 90 μm. They are mixed with additives introduced in the grinder by a line 14. These corrective additives are used, if any essential chemical compound needed in the mixture of coal ash and limestone like alumina oxide or iron oxide or silica content are not present in the required amount.

The ground material is supplied to a blender 15, in which is added lime CaO via a supply 15. This lime has—as the power plant ashes—also been transported from the combined power and calcination plant to the cement plant 90.

In this embodiment, the calcined raw mix is preheated after the blender 13 by air before its introduction into the kiln 16. This allows decreasing the size of the kiln 16. The calcined raw mix of the correct size and composition for cement making is introduced into a preheater tower 51 via line 17. At its exit the preheater connects its lowermost cyclone to the kiln. This cyclone discharges the heated cement raw mix via line 54 into the kiln 16. As no kiln gas is forwarded through the preheater tower, recarbonation of the calcined material is avoided.

The preheating air is taken from the clinker cooler 20. Via air intake line 23, ambient air is introduced in the system by a fan 22 to the clinker cooler and heated therein by cooling down the cement clinker. The heated air exits the clinker cooler in a first stream via line 25 and is supplied to the kiln 16 as kiln combustion air. The second stream bypasses the kiln via line 26 and is fed into the preheater tower 51 consisting of a series of cyclones The air leaving the uppermost cyclone of the preheater tower is mixed into line 45 with the flue gases leaving the kiln 16.

In the rotary kiln 16, the preheated and calcined raw mix is burnt into cement clinker. For combustion in the kiln 16, a small amount of fuel, i.e. coal is injected via a burner 18 together with primary air. The cement clinker—in form of nodules—is then forwarded via line 19 into a cement cooler 20, which might be a moving grate. The cooled clinker nodules are finally supplied to a cement grinder, which is not shown.

The flue gas stream exiting the kiln 16, relatively concentrated in $SO_2$, can be cost-effectively treated by taking a portion of it and cleaning it in a wet limestone scrubber to a valuable product gypsum, which can be added to the final cement product. A bypass flue gas line 45 is connected to a flue gas cooler 46 and a filter 47. This filter could be an electrostatic precipitator wherein the entrained particles are separated, the coarse particles being returned to the process and the fine particles being separately disposed. A fan 48 and a limestone scrubber 49 follow the electrostatic precipitator downstream. The gas exit of the scrubber is connected to stack 50. Combining CaCO3 with SO2 and oxygen form gypsum CaSO4 in the limestone scrubber. This gypsum can be used as an additive to ground clinker in the final cement product.

Obviously, numerous modifications and variations of the present invention are possible in light of the above teachings. It is therefore to be understood that, within the scope of the appended claims, the invention may be practiced otherwise than as specifically described herein.

List of Designations

1 steam generator, PC boiler, circulating fluidized bed boiler
2 hydrocarbon feed line
3 sulfur sorbent feed line
4 secondary (overbed) air line to 1
5 fluidizing air supply
6 solids return line
7 solids return line bypassing 9
8 cyclone
9 fluidized bed heat exchanger
10 solids return line to 9
11 hot bed material discharge
12 grinder
13 blender
14 additive supply to 12
15 lime supply to 13
16 kiln
17 calcined material line to preheater
18 fuel supply to 16, coal
19 kiln clinker discharge line, nodules
20 clinker cooler
22 fan
23 air supply to 20
25 air supply to 16
26 air line bypassing kiln 16
27 fan
28 air heater
29 air supply to air heater
30 hot air discharge from air heater, air supply to 1
31 scrubber
32 gas and fly ash line
33 steam heat exchanger
34 economizer
35 evaporator
36 superheater and reheater
37 filter, electrostatic precipitator
38 gas exhaust line
40 fan
41 stack
42 steam turbine island
43 ash cooler
45 flue gas from kiln 16
46 flue gas cooler
47 filter
48 fan
49 limestone scrubber
50 stack
51 preheater
54 calcined material line to 16
60 calciner 61 limestone feed line
62 primary air line
63 coal feed line
64 secondary air line
65 cyclone
66 cyclone
67 solids line to 70
68 flue gas line to 1
70 solids cooler
71 fan
72 cyclone
90 cement plant

What is claimed is:

1. A method of producing a calcined raw meal and of producing additional steam in an existing steam generator, characterized in that pulverized raw meal, hydrocarbon, primary air and secondary air are fed to a calciner system (60), wherein the raw meal is calcined in a temperature range between 850° C. and 950° C., the calcined raw meal is separated from the calciner flue gases at the exit of the calciner system, the calcined raw meal is directed through a cooler (70), in which it exchanges its heat with the secondary air, the calciner exhaust gases are directed in the gas path of the backpass of the steam generator (1) at an appropriate temperature window and are used for steam production.

2. A process according to claim 1, wherein the raw meal consists mainly of limestone ($CaCO_3$) and the calcined material is mainly lime ($CaO$).

3. A process according to claim 1, wherein the fuel feed (4) to the steam generator (1) is reduced during introduction of the exhaust gases into its backpass.

4. A process according to claim 2, the fuel for the steam generator having a high sulfur content, characterized in that the feed of the sulfur sorbent (3, 31) to the steam generating line is ceased during introduction of the exhaust gases into its backpass.

5. A process according to claim 2, wherein the cold lime is blended with combustion residues from the steam generator (1), preheated and fed into a rotary kiln (16) for clinker production.

* * * * *